US006002375A

United States Patent [19]

Corman et al.

[11] Patent Number: 6,002,375

[45] Date of Patent: Dec. 14, 1999

[54] MULTI-SUBSTRATE RADIO-FREQUENCY CIRCUIT

[75] Inventors: David Warren Corman, Gilbert; Richard Scott Torkington, Mesa; Stephen Chih-Hung Ma, Mesa; Dean Lawrence Cook, Mesa; Kenneth Brice-Heames, Mesa, all of Ariz.

[73] Assignee: Motorola, Inc., Schaumburg, Ill.

[21] Appl. No.: 08/922,057

[22] Filed: Sep. 2, 1997

[51] Int. Cl.[6] .............................. H01Q 1/38; H04B 1/38

[52] U.S. Cl. ......................... 343/853; 343/853; 333/247; 257/728

[58] Field of Search .................................. 343/853, 861; 330/250, 310; 257/723, 724, 728, 750; 333/33, 247

[56] References Cited

U.S. PATENT DOCUMENTS

| | | | |
|---|---|---|---|
| 4,423,388 | 12/1983 | Crescenzi et al. | 330/277 |
| 4,490,721 | 12/1984 | Stockton et al. | 343/368 |
| 4,782,381 | 11/1988 | Ruby et al. | 357/74 |
| 4,823,136 | 4/1989 | Nathanson et al. | 342/368 |
| 5,063,177 | 11/1991 | Geller et al. | 437/209 |
| 5,376,942 | 12/1994 | Shiga | 343/700 |
| 5,391,917 | 2/1995 | Gilmour et al. | 257/690 |
| 5,404,581 | 4/1995 | Honjo | 455/90 |
| 5,426,319 | 6/1995 | Notani | 257/275 |
| 5,611,008 | 3/1997 | Yap | 385/14 |
| 5,612,556 | 3/1997 | Malhi et al. | 257/275 |
| 5,614,740 | 3/1997 | Gardner et al. | 257/222 |
| 5,781,162 | 7/1998 | Peterson et al. | 343/853 |

*Primary Examiner*—Don Wong
*Assistant Examiner*—James Clinger
*Attorney, Agent, or Firm*—Gregory J. Gorrie

[57] ABSTRACT

A radio-frequency circuit (20) includes a hybrid integrated circuit (24) having a passive circuit element (38) and a d-c biasing circuit element (54) embedded within a first substrate (32) of a low cost and rugged first semiconducting material, and first and second active circuit elements (36, 40) embedded within second and third substrates (44, 46), respectively, of a second semiconductor material having the characterisitics of greater frangibility but higher gain than the first semiconductor material. The first and second activ circuit elements (36, 40) are substantially first and second single components (36, 40), and are each electrically coupled to the passive circuit element (38). The d-c biasing circuit element (54) is electrically coupled to the first and second active circuit elements (36, 40). The second and third substrates (44, 46) are physically coupled to the first substrate (32), which is thicker than either the second or third substrate (44, 46).

20 Claims, 2 Drawing Sheets

MULTI-SUBSTRATE RADIO-FREQUENCY CIRCUIT

FIELD OF THE INVENTION

The current invention relates to radio-frequency circuits. Specifically, the current invention relates to radio-frequency circuits wherein a radio-frequency signal propagates between radio-frequency circuit elements fabricated upon differing substrates.

BACKGROUND OF THE INVENTION

High-density microwave or millimeter-wave circuitry is often photolithographically fabricated upon a semiconductor substrate. Gallium arsenide (GaAs) is ordinarily the semiconductor of choice, offering significant increases in gain over other semiconductors (e.g. silicon) at the desired frequencies.

Several problems arise in the use of gallium arsenide substrates. As a material, gallium arsenide has a high frangibility. This high frangibility leads to an increase in wafer breakage during the circuit fabrication process, hence reducing the effective circuits-per-wafer yield. This is especially pronounced for large circuits having low initial circuit-per-wafer densities.

High frangibility also means that large gallium arsenide circuits are more likely to suffer damage from shock and vibration than are similar circuits in other materials. This can become a limiting factor in the design of devices which must be able to tolerate high G-forces (such as handheld telephones, which may be dropped) and extremes of pressure and vibration (such as a satellite during launch).

Gallium arsenide also suffers from poor thermal conductivity. Poor thermal conductivity requires that gallium arsenide substrates be thin to allow for adequate heat sinking and power dissipation. Making a given gallium arsenide substrate thin, however, exacerbates the specific frangibility of that circuit, and increases the possibility of device failure.

Among semiconductors, gallium arsenide is inherently expensive. Also, the fabrication techniques required of gallium arsenide are themselves more expensive than those of other semiconductors. A given gallium arsenide circuit may be sufficiently expensive, compared to a similar circuit in silicon, so as to prohibit fabrication in production quantities. Thus, those applications where the use of gallium arsenide would be most desirable may also be the very applications where the cost of gallium arsenide would severely limit its use. For example, a phased antenna array, having a thousand active elements coupled to a thousand gallium arsenide circuits, may be prohibitively expensive for commercial applications.

What is needed is a way to create circuits with the high gain of gallium arsenide at microwave and millimeter-wave frequencies, while minimizing the effects of the high frangibility and low thermal conductivity of gallium arsenide as well as the material and fabrication costs thereof.

BRIEF DESCRIPTION OF THE DRAWINGS

The invention is pointed out with particularity in the appended claims. A more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

Figure 1B:
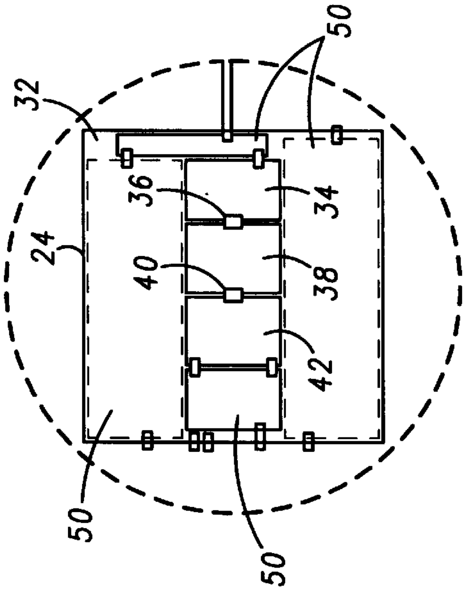
FIG. 1B depicts an expanded view of a hybrid integrated circuit in accordance with a preferred embodiment of the present invention.
Figure 1A:
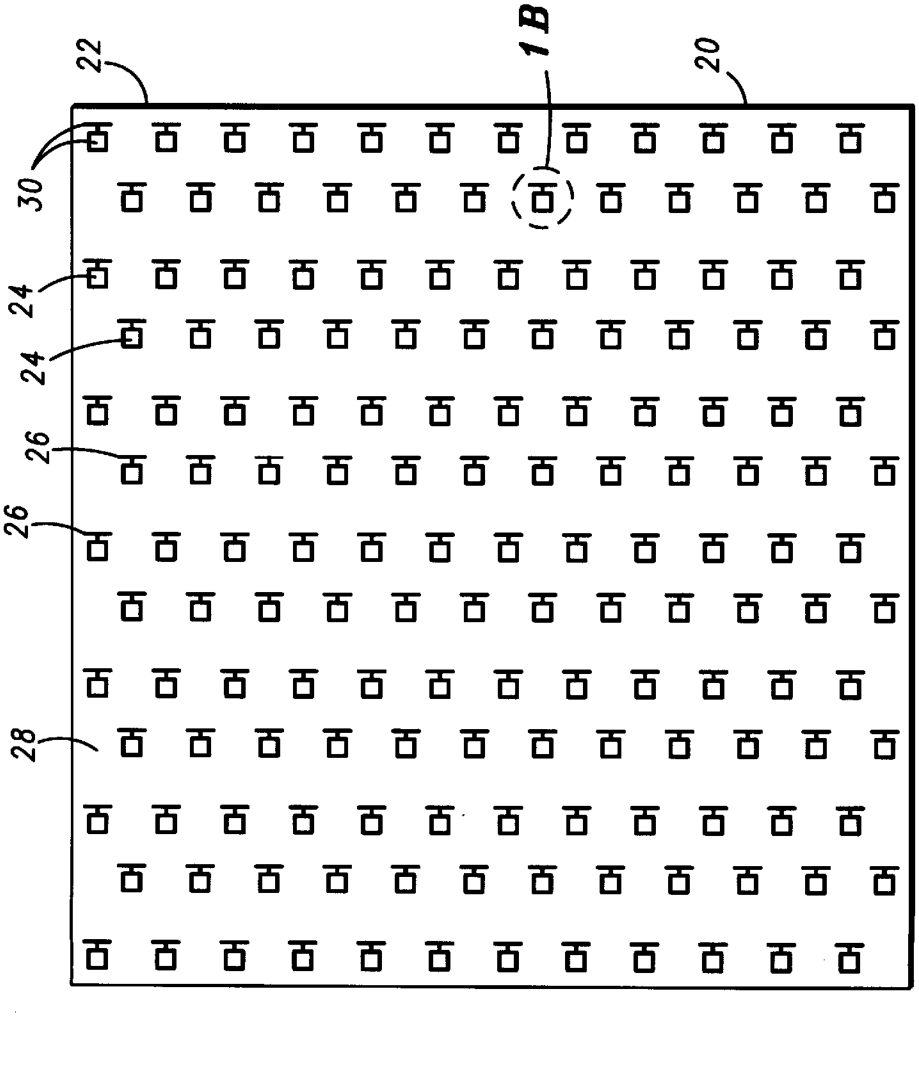
FIG. 1A depicts a plan view of a radio-frequency circuit arranged as an active radio-frequency antenna array in accordance with a preferred embodiment of the present invention.
Figure 2:
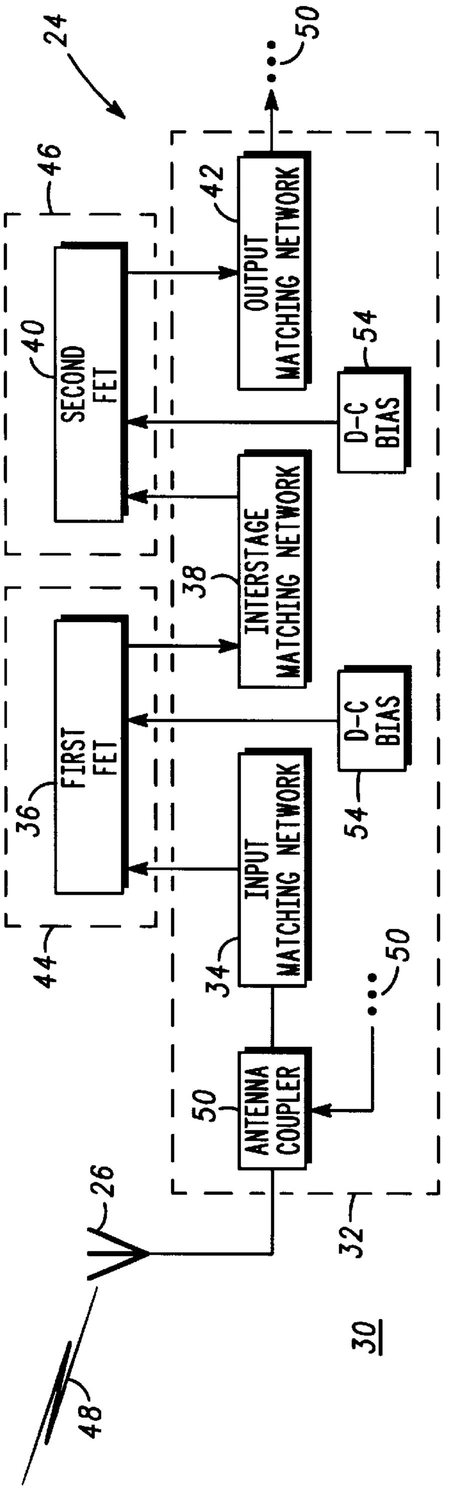
FIG. 2 depicts a block diagram of a hybrid radio-frequency integrated circuit utilized by the antenna array depicted in FIG. 1 in accordance with a preferred embodiment of the present invention.
Figure 3:
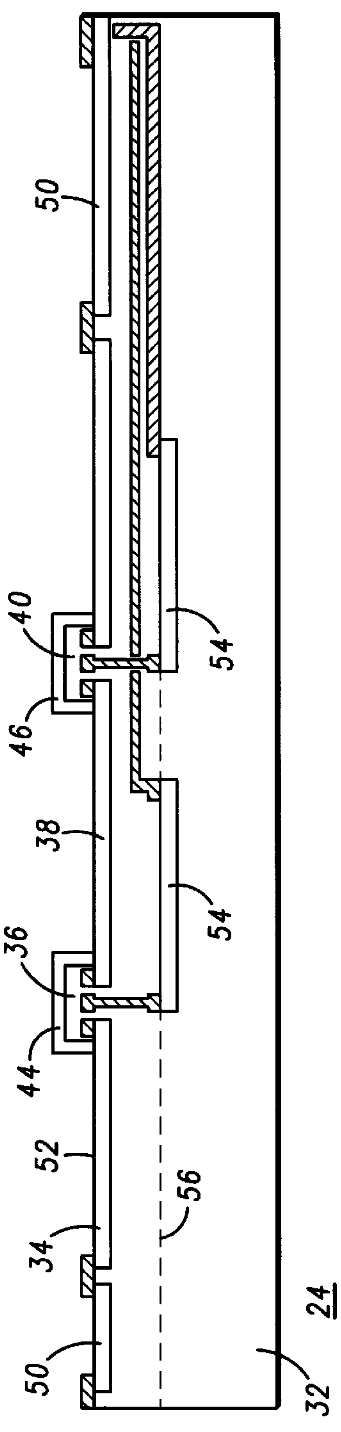
FIG. 3 depicts a cross-sectional side view of the hybrid radio-frequency integrated circuit depicted in FIG. 2 in accordance with a preferred embodiment of the present invention.

FIG. 1A depicts a plan view of a radio-frequency circuit 20 arranged as an active radio-frequency antenna array 22, while FIG. 1B depicts an expanded view of a hybrid integrated circuit in accordance with a preferred embodiment of the present invention, FIG. 2 depicts a block diagram of and FIG. 3 depicts a cross-sectional side view of a hybrid radio-frequency integrated circuit 24 utilized by antenna array 22, in accordance with a preferred embodiment of the present invention. The following discussion refers to FIGS. 1 through 3.

In the exemplary embodiment of FIG. 1, array 22 has a multiplicity of radiative elements 26 arranged as a phased antenna array such as may be used for microwave and/or millimeter-wave transception on a satellite. Each radiative element 26 is electrically coupled to one of a multiplicity of hybrid integrated circuits 24 providing, among other functions, a front-end microwave and/or millimeter-wave amplifier. Integrated circuits 24 are bonded to a non-conductive substrate 28 (e.g. a crystalline silicon plate) upon which radiative elements 26 are photolithographically formed. Data, signal, control, and power traces (not shown) for integrated circuits 24 are also formed on non-conductive substrate 28.

Those skilled in the art will readily appreciate that active antenna array 22 may be a single active antenna 30 having a single radiative element 26 coupled to a single integrated circuit 24 without departing from the function or spirit of the present invention.

Each hybrid integrated circuit 24 contains a first substrate 32 (FIGS. 2 and 3), with circuitry either coupled thereto or embedded or formed therein. In the exemplary embodiment depicted in FIGS. 2 and 3, integrated circuit 24 is a simple two-stage radio-frequency amplifier. This amplifier is formed around an input impedance-matching network 34, a first FET (field-effect transistor) 36 acting as a first amplifier stage, an interstage impedance-matching network 38, a second FET 40 acting as a second amplifier stage, and an output impedance-matching network 42. Input, interstage, and output networks 34, 38, and 42 are passive radio-frequency signal-processing circuit elements fabricated within first substrate 32. First and second FETs 36 and 40 are active radio-frequency signal-processing circuit elements embodied as single active components and fabricated within second and third substrates 44 and 46, respectively.

In the exemplary embodiment, first substrate 32 is of a first semiconducting material, silicon, while second and third substrates 44 and 46 are of a second semiconducting material, gallium arsenide. Silicon has low frangibility, high thermal conductivity, and low cost. Unfortunately, silicon also has low gain at microwave and/or millimeter-wave frequencies. Gallium arsenide, relative to silicon, has high gain at microwave and/or millimeter-wave frequencies, but also has high frangibility, low thermal conductivity, and high cost.

Second and third substrates 44 and 46 are bonded to or otherwise physically coupled to first substrate 32. First substrate 32, being of silicon, functions well as a base substrate serving as a carrier for second and third substrates 44 and 46, and hence for first and second FETs 36 and 40. In contrast, second and third substrates 44 and 46, being of gallium arsenide, provide the gain required of first and second FETs 36 and 40 at microwave and/or millimeter-wave frequencies. Conventional semiconductor fabrication techniques may be used to form hybrid integrated circuit 24.

The relatively poor thermal conductivity of gallium arsenide suggests that second and third substrates 44 and 46 be thin to allow adequate heat conduction while minimizing thermal stresses. The high frangibility of gallium arsenide, on the other hand, suggests that second and third substrates 44 and 46 be thick to be mechanically robust. The robustness of a substrate is proportional to its thickness and inversely proportional to its surface area. By limiting the circuit elements within second and third substrates 44 and 46 to first and second FETs 36 and 40, each a single active component, the present invention minimizes the required substrate surface area. This allows second and third substrates 44 and 46 to be thinner while maintaining robustness. Additionally, this effects a reduction in the amount of material in second and third substrates 44 and 46 and, due to the high cost of gallium arsenide as a material, effects a significant cost reduction.

As exemplified, input, interstage, and output impedance-matching networks 34, 38, and 42 are fabricated within first substrate 32 (silicon), while first and second FETs 36 and 40 are fabricated within second and third substrates 44 and 46 (gallium arsenide), respectively. Since first and second FETs 36 and 40 are each single active components, the surface area of second and third (gallium arsenide) substrates 44 and 46 are significantly reduced over the surface area of a conventional gallium arsenide radio-frequency circuit substrate. This reduction in surface area allows second and third substrates 44 and 46 to be thinner than would otherwise be feasible, thus improving thermal conduction and dissipation. Simultaneously, first substrate 32, being silicon and a good thermal conductor, is thicker than would be an equivalent gallium arsenide substrate, and significantly thicker than second and third substrates 44 and 46. Since second and third substrates 44 and 46 are physically coupled to and supported by first substrate 32, the resultant hybrid integrated circuit 24 is more robust than would be an equivalent conventional gallium arsenide integrated circuit.

Those skilled in the art will realized that first and second FETs 36 and/or 40 need not be single active components. Other components may be included within the circuit elements embedded within second and third substrates 44 and/or 46 without altering the aims and functions of the present invention. For example, small capacitive and/or inductive features, such as stubs, may be formed with FETs 36 and/or 40 on substrates 44 and/or 46 in a manner that causes substrates 44 and/or 46 to substantially remain with single active components embedded therein.

A radio-frequency signal 48 propagates through hybrid integrated circuit 24 (FIG. 2) from input impedance-matching network 34 to output impedance-matching network 42, inclusively. Signal 48 propagates from input network 34 to first FET 36. An output of input network 34 matches in impedance and is electrically coupled to an input of first FET 36. Signal 48 then propagates from first FET 36 to interstage network 38. An output of first FET 36 is matched in impedance by and is electrically coupled to an input of interstage network 38. Signal 48 then propagates from interstage network 38 to second FET 40. An output of interstage network 38 matches in impedance and is electrically coupled to an input of second FET 40. Signal 48 then propagates from second FET 40 to output network 42. An output of second FET 40 is matched in impedance by and is electrically coupled to an input of output network 42.

Input, interstage, and output networks 34, 38, and 42 are passive circuit elements requiring no gain, and are fabricated in silicon. First and second FETs 36 and 40 are active circuit elements requiring gain, and are fabricated in gallium arsenide. Radio-frequency signal 48 therefore zigzags between substrates. The overall savings in cost and decrease in frangibility significantly outweighs any theoretical increase in design complexity due to multiple substrates.

Those skilled in the art will appreciate that the exemplary embodiment depicted above has been minimized for the sake of simplicity. Conventionally, hybrid integrated circuit 24 desirably contains many more functional circuit elements, e.g. couplers, amplifiers, oscillators, mixers, splitters, modulators, converters, etc. These additional functional circuit elements are not relevant to the present discussion and are herein lumped together as other circuit elements 50.

In antenna array 22, radiative elements 26 are typically arranged at one-half wavelength (½) apart. At microwave and/or millimeter-wave frequencies, this distance may be small (e.g. approximately 5 millimeters at 30 GigaHertz). The surface area of hybrid integrated circuit 24 is desirably shaped and dimensioned so as to allow proper placement of radiative elements 26. Difficulties may arise in the arrangement of circuit elements within the available surface area. To overcome these difficulties, first substrate 32 may be thick enough to allow subsurface placement of some circuit elements.

In FIG. 3, input, interstage, and output networks 34, 38, and 42 are embedded within first substrate 32 at a first embedment level 52, which is the surface of first substrate 32. In the exemplary embodiment, direct-current (d-c) biasing circuits 54 are embedded deeply within first substrate 32 at a second embedment level 56 not coplanar with first embedment level 52. Biasing circuits 54 are support circuit elements, and may be contain both active and passive components composed of silicon, as no microwave and/or millimeter-wave signals are involved. Biasing circuits 54 are electrically coupled to first and second FETs 36 and 40 through vias and other conventional interconnections, allowing biasing signals (not shown) to propagate between biasing circuits 54 and first and second FETs 36 and 40. By embedding biasing circuits 54 in the third dimension within first substrate 32, the dimensions of the surface area of integrated circuit 24 are reduced, reducing placement problems in array 22.

Additionally, antenna array 22 contains a multiplicity of identical hybrid integrated circuits 24, Each integrated circuit 24 is proximate and coupled to radiative element 26, radiative element 26 and integrated circuit 24 together being active antenna 30. By embedding biasing circuits 54 within each integrated circuit 24, biasing signals need not be routed to each integrated circuit 24 on non-conducting substrate 28, where surface area is at a premium. By reducing the trace overburden of non-conducting substrate 28, antenna array 22 may be implemented for higher-frequencies requiring denser placements of active antennas 30, hence placements of radiative elements 26 at shorter half-wavelength distances.

Those skilled in the art will readily recognize that the embedment of d-c biasing circuit 54 at second embedment level 56 is purely exemplary. Any number of any circuit elements not requiring gain at microwave and/or millimeter-wave frequencies, hence able to be fully realized in silicon, may be embedded within first (silicon) substrate 32 at any number of embedment levels.

In alternative embodiments, the first semiconducting material is selected from the group consisting of silicon (Si), glass, teflon and aluminia, and the second semiconducting material is selected from the group consising of gallium arsenide (GaAs), indium phosphide (InP) and silicon germanium (SiGe).

In summary, the present invention provides for hybrid integrated circuit 24 operating at microwave and/or millimeter-wave frequencies, wherein passive and support circuit elements 34, 38, 42, and 54 are realized in silicon, with active circuit elements 36 and 40 realized in gallium arsenide. Though this, hybrid integrated circuit 24 has decreased frangibility, increased thermal conductivity, reduced cost, and decreased surface area over conventional techniques.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A radio-frequency (RF) circuit comprising:

a first passive RF matching element fabricated within a first substrate at a first embeddment level the first substrate being selected from the group consisting of silicon, glass. Teflon and aluminia;

an RF amplifier circuit fabricated within a second substrate physically coupled to said first substrate, said RF amplifier circuit being electrically coupled to said first passive RF matching element, the second substrate being selected from the group consisting of gallium arsenide (GaAs), indium phosphide and silicon germanium;

a second passive RF matching element fabricated within said first substrate at said first embeddment level and electrically coupled to said RF amplifier circuit; and a DC bias circuit fabricated within the first substrate at a second embeddment level, the DC bias circuit for providing DC bias current to the RF amplifier circuit, the second embeddment level being non-coplanar with the first embeddment level.

2. A radio-frequency circuit as claimed in claim 1 wherein the RF amplifier circuit is a first RF amplifier circuit, and wherein the radio frequency circuit further comprises:

a second RF amplifier circuit fabricated within a third substrate physically coupled to said first substrate, said second RF amplifier circuit being electrically coupled to said second passive RF matching element, the third substrate comprising the same material as the second substrate; and a third passive RF matching element fabricated within said first substrate at said first embeddment level and electrically coupled to said second RF amplifier circuit.

3. A radio-frequency circuit as claimed in claim 2 wherein said second and third substrates are comprised of GaAs and the first substrate is comprised of Silicon.

4. A radio-frequency circuit as claimed in claim 2 further comprising a radiative element electrically coupled to said first passive RF matching element, said radiative element being one of a plurality of radiative elements of an array antenna, and wherein:

said first and second passive RF matching elements, said first and second RF amplifiers and said DC bias circuits are formed together as an integrated circuit; and said integrated circuit is coupled to said radiative element.

5. A radio-frequency circuit as claimed in claim 3 wherein said first substrate is a carrier for said second and third substrates.

6. A radio-frequency circuit as claimed in claim 5 wherein:

said first substrate is thicker than said second substrate; and said first substrate is thicker than said third substrate.

7. A radio-frequency circuit as claimed in claim 2 wherein:

said first passive RF matching element is substantially a first impedance-matching circuit for impedance matching to an input of said first RF amplifier circuit;

and wherein said second passive RF matching element is substantially a second impedance matching circuit for impedance matching between an output of said first RF amplifier circuit and an input of said second RF amplifier circuit.

8. A radio-frequency circuit as claimed in claim 4 wherein said second substrate has first and second opposite sides, and wherein said first and third substrates are bonded to said first opposite side, said radio frequency circuit additionally comprising:

a fourth substrate, the fourth substrate being non-conductive, said second opposite side of said second substrate being bonded to said fourth substrate; and control and power traces formed on said fourth substrate, and wherein the radiative elements are photolithographically formed upon said fourth substrate.

9. A radio-frequency circuit as claimed in claim 8 further comprising an antenna coupler fabricated within the first substrate at the first embeddment level, said antenna coupler for coupling signals from one of said radiative elements to said first passive RF matching element and to other circuitry embedded in said first substrate.

10. A radio-frequency circuit as claimed in claim 9 wherein:

said integrated circuit is one of a multiplicity of substantially identical integrated circuits; and each of said multiplicity of integrated circuits is located proximate to and coupled to one of said radiative elements, said radiative elements being spaced at approximately one-half wavelength at a millimeter-wave frequency of operation for said array antenna.

11. A radio-frequency circuit as claimed in claim 2 wherein said second substrate has first and second opposite sides, and wherein said first and third substrates are bonded to said first opposite side, said radio frequency circuit additionally comprising:

a fourth substrate, the fourth substrate being non-conductive, said second opposite side of said second substrate being bonded to said fourth substrate; and control and power traces formed on said fourth substrate.

12. A radio-frequency circuit as claimed in claim 11 wherein:

the fourth substrate comprises a crystalline Silicon plate.

13. A method of processing a radio-frequency RF signal through a radio-frequency circuit extending over first, second, and third semiconductor substrates, wherein said second and third substrates are physically coupled to said first substrate, said method comprising the steps of:

propagating the RF signal through a first passive RF impedance matching element fabricated within the first substrate at a first embeddment level, the first substrate being selected from the group consisting of silicon, glass, Teflon and aluminia;

amplifying the RF signal with an RF amplifier circuit fabricated within a second substrate physically coupled to said first substrate, said RF amplifier circuit being electrically coupled to said first passive RF matching element, the second substrate being selected from the group consisting of gallium arsenide (GaAs), indium phosphide and silicon germanium;

propagating the RF signal through a second passive RF matching element fabricated within said first substrate at said first embeddment level and electrically coupled to said RF amplifier circuit; and providing DC bias current to the RF amplifier circuit with a DC bias circuit fabricated within the first substrate at a second embeddment level, the second embeddment level being non-coplanar with the first embeddment level.

14. A method of processing a radio-frequency signal as claimed in claim 13 wherein the RF amplifier circuit is a first RF amplifier circuit, and wherein the method further comprises the steps of:

amplifying said RF signal with a second RF amplifier circuit fabricated within a third substrate physically coupled to said first substrate, said second RF amplifier circuit being electrically coupled to said second passive RF matching element, the third substrate comprising the same material as the second substrate; and propagating said RF signal in a third passive RF matching element fabricated within said first substrate at said first embeddment level and electrically coupled to said second RF amplifier circuit.

15. A millimeter-wave active radio-frequency antenna array comprising:

a non-conductive plate;

a multiplicity of radiative elements; and a multiplicity of hybrid radio-frequency (RF) integrated circuits wherein each of said hybrid RF integrated circuits is electrically coupled to one of said radiative elements, each hybrid RF integrated circuit bonded to said non-conductive plate, and wherein each of said hybrid RF integrated circuits comprises:

a first passive RF matching element fabricated within a silicon substrate;

an RF amplifier circuit electrically coupled to said first passive RF matching element, said RF amplifier circuit fabricated within a Gallium Arsenide (GaAs) substrate material, said physically coupled to said silicon substrate;

a second passive RF matching element fabricated within said silicon substrate electrically coupled to said RF amplifier circuit; and a DC bias circuit fabricated within the silicon substrate for providing DC bias current to the RF amplifier circuit.

16. An active radio-frequency antenna array as claimed in claim 17 wherein:

said first passive RF matching element within each of said hybrid RF integrated circuits is substantially a first impedance-matching circuit for impedance matching to a first port of said RF amplifier circuit;

and wherein said second passive RF matching circuit is substantially a second impedance matching circuit for impedance matching to a second port of said RF amplifier circuit.

17. An active radio-frequency antenna array as claimed in claim 15 wherein:

said first and second passive RF matching elements of each of the hybrid RF integrated circuits is fabricated within the silicon substrate at a first embeddment level; and the DC bias circuit of each of said hybrid integrated RF circuits is fabricated within said silicon substrate at a second embeddment level, the second embeddment level being non-coplanar with the first embeddment level.

18. An active radio-frequency antenna array as claimed in claim 16 wherein the radiative elements are photolithographically formed upon said non-conductive plate, and wherein the active radio-frequency antenna array further comprises control and power traces for each hybrid RF integrated circuit formed on said non-conductive plate.

19. An active radio-frequency antenna array as claimed in claim 18 wherein the non-conductive plate comprises a crystalline silicon plate.

20. An active radio-frequency antenna array as claimed in claim 18 wherein each of said hybrid RF integrated circuits further comprises an antenna coupler fabricated within the silicon substrate at the first embeddment level, said antenna coupler for coupling signals from one of said radiative elements to said first passive RF matching element and to other circuitry embedded in said silicon substrate.

* * * * *